United States Patent
Perisetty et al.

(10) Patent No.: US 11,665,031 B1
(45) Date of Patent: May 30, 2023

(54) TUNING ANALOG FRONT END RESPONSE FOR JITTER TOLERANCE MARGINS

(71) Applicant: Synopsys, Inc., Mountain View, CA (US)

(72) Inventors: Srinivas Perisetty, Telangana (IN); Jayabharath Reddy Madi Reddy, Telangana (IN); Suresh Nagula, Telangana (IN); Philip Michael Chopp, Waterdown (CA)

(73) Assignee: SYNOPSYS, INC., Mountain View, CA (US)

(*) Notice: Subject to any disclaimer, the term of this patent is extended or adjusted under 35 U.S.C. 154(b) by 0 days.

(21) Appl. No.: 17/494,136

(22) Filed: Oct. 5, 2021

Related U.S. Application Data

(60) Provisional application No. 63/087,679, filed on Oct. 5, 2020.

(51) Int. Cl.
| | |
|---|---|
| *H04B 1/18* | (2006.01) |
| *H04L 27/00* | (2006.01) |
| *H04L 27/26* | (2006.01) |
| *H04B 1/22* | (2006.01) |
| *H04B 1/16* | (2006.01) |

(52) U.S. Cl.
CPC ........... *H04L 27/0002* (2013.01); *H04B 1/18* (2013.01); *H04B 1/22* (2013.01); *H04L 27/2691* (2013.01); *H04L 27/2695* (2013.01); *H04B 1/1638* (2013.01)

(58) Field of Classification Search
CPC ............. H04L 27/2691; H04L 27/2695; H04L 27/0002; H04B 1/18; H04B 1/22; H04B 1/1638
See application file for complete search history.

(56) References Cited

U.S. PATENT DOCUMENTS

| | | | | |
|---|---|---|---|---|
| 7,907,555 | B1* | 3/2011 | Sankabathula | H04B 17/318 370/284 |
| 9,595,990 | B1* | 3/2017 | Zhang | H04L 25/03885 |
| 2004/0151264 | A1* | 8/2004 | Montojo | H03G 3/3036 375/345 |
| 2006/0222118 | A1* | 10/2006 | Murthy | H03G 3/3068 375/345 |
| 2007/0129034 | A1* | 6/2007 | Adams | H03G 3/3068 455/138 |
| 2012/0169565 | A1* | 7/2012 | Morris, III | H04B 1/0458 343/860 |

* cited by examiner

*Primary Examiner* — David S Huang
(74) *Attorney, Agent, or Firm* — Lewis Roca Rothgerber Christie LLP

(57) ABSTRACT

A method for tuning an analog front end response is provided. The method includes determining a peaking control value for an analog front end (AFE) of a receiver, determining an attribute corresponding to the peaking control value, selecting the peaking control value as the operating peaking control value for the AFE based on the attribute being determined to be higher than a previous attribute, and performing a receiver adaptation using the peaking control for a one or more transmitter configurations.

20 Claims, 13 Drawing Sheets

TUNING ANALOG FRONT END RESPONSE FOR JITTER TOLERANCE MARGINS

CROSS-REFERENCE TO RELATED APPLICATIONS

The present application claims the benefit under 35 U.S.C. § 119(e) of U.S. Provisional Patent Application No. 63/087,679 filed on Oct. 5, 2020, which is incorporated herein by reference in its entirety for all purposes.

TECHNICAL FIELD

The present disclosure relates generally to an analog front end (AFE). In particular, the present disclosure relates to tuning of the AFE response to improve jitter tolerance margins.

BACKGROUND

It is challenging to design a receiver integrated circuit that meets stringent jitter tolerance (JTOL) specifications across process, voltage, and temperature (PVT) and over a wide range of channels due to large process/temperature and parasitic variations. The gain and peaking of the receiver analog front end (AFE) are used to compensate for inter-symbol interference (ISI) and loss of signal power in high loss channels. When a low AFE gain PVT condition is corrected, then a high gain/high boost PVT condition suffers from excessive peaking, which fails to meet the JTOL specification. When tuning for the high AFE gain/high boost PVT condition, the low gain PVT condition results in JTOL failure due to reduced gain/bandwidth. Even though an AFE has programming options, only one full adaptation cycle is often possible due to low exit latency time requirements which may lead to a failure to meet the JTOL specifications.

SUMMARY

In one aspect, a method includes determining a peaking control value for an analog front end (AFE) of a receiver, determining an attribute corresponding to the peaking control value, selecting the peaking control value as the operating peaking control value for the AFE based on the attribute being determined to be higher than a previous attribute, and performing a receiver adaptation using the peaking control for one or more transmitter configurations.

In one aspect, a system includes a memory storing instructions, and a processor, coupled with the memory and to execute the instructions. The processor is configured to determine a peaking control value for an AFE of a receiver, determine an attribute corresponding to the peaking control value, select the peaking control value as the operating peaking control value for the AFE based on the attribute being determined to be higher than a previous attribute, and perform a receiver adaptation using the peaking control for one or more transmitter configurations.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
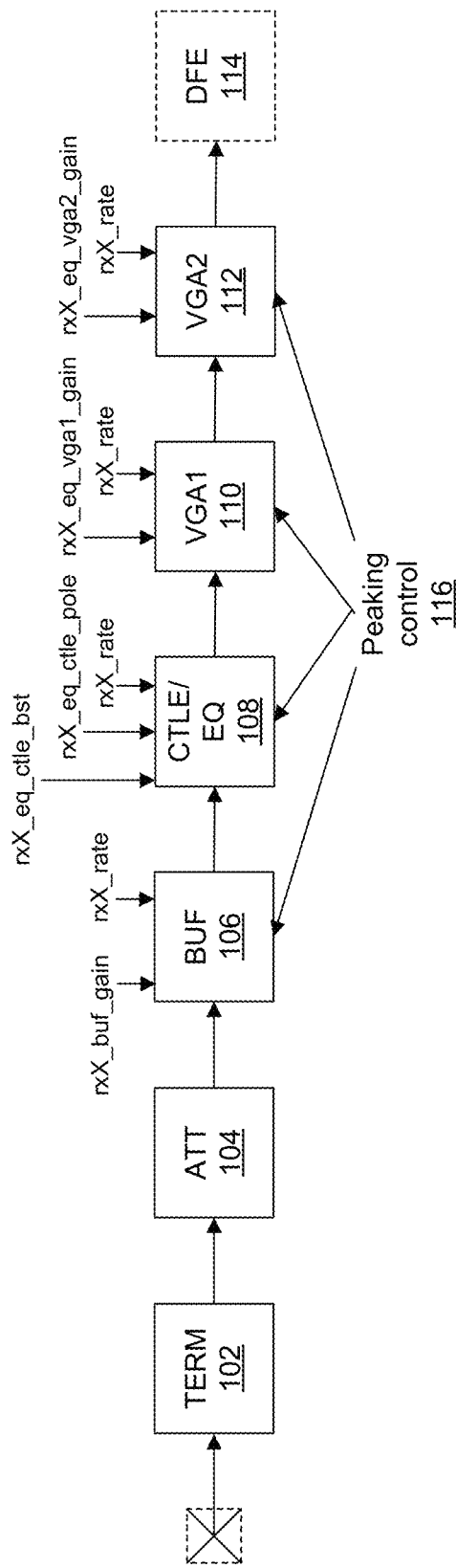
FIG. 1 shows an analog front end (AFE) block diagram, according to an exemplary embodiment of the present disclosure.

In order to meet jitter tolerance (JTOL) specifications across process, voltage, and temperature (PVT), the peaking gain and bandwidth of an analog front end (AFE) are adjusted for various PVT conditions. Thus, a different peaking gain and bandwidth are used for different PVT conditions (e.g., low gain PVT condition vs. high gain PVT condition). The peaking control may be used to adjust the peaking gain and bandwidth of the AFE by controlling the current in various circuits of the AFE.

In the present disclosure, an AFE peaking control is described to adjust the peaking gain and bandwidth of an AFE frequency response around a system Nyquist frequency during receiver adaptation. As a result, an improved gain/bandwidth trade-off needed to meet/exceed the JTOL targets may be achieved.

In some embodiments, a damping ratio of the AFE transfer function may be reduced when an AFE peaking control setting is increased. The damping ratio may be indicative of the peaking in the AFE frequency response. The decrease in the damping ratio may produce a frequency response with higher peaking gain and narrower peaking bandwidth. Process corners and device/routing parasitic effects may cause variations in the circuit behavior that may cause changes in the AFE peaking for a fixed peaking control setting. The AFE response at Nyquist frequency can become more or less peaky as a function of device/routing parasitic effects. Routing parasitics may refer to extraction types. For example, the best case extraction may have a minimum RC parasitics and the worst case extraction may have a maximum RC parasitics. Device variation may refer to process corners (e.g., slow nFET/slow pFET, typical nFET/typical pFET, fast nFET/fast pFET, fast nFET/slow pFET, and slow nFET/fast pFET). In one example, process corners may represent one or more bounds of one or more parameters of the AFE such as a lowest AFE broadband gain and highest AFE broadband gain. For example, various components of the integrated circuit (IC) may have some routing parasitic effect value that is based on routing parasitic capacitance and/or inductance that may degrade signal quality due to residual inter-symbol interference (ISI), transistor device noise, and the like. Jitter may arise from signal attenuation due to ISI. However, as described herein, the peaking control setting (also referred to herein as the AFE peaking control value) can be adjusted to compensate for these variations and produce the targeted response.

Embodiments disclosed herein solve the problem of failure to meet JTOL targets by changing the AFE peaking control setting during the receiver adaptation.

In some embodiments, the AFE peaking control setting may be selected as part of the receiver adaptation. The AFE peaking control setting may be swept from a minimum to a maximum or searched from an initial center value. The AFE mid-band equalization (boost) and gain controls may be fine tuned for each peaking control setting. In some aspects, an optimal peaking control setting may be the one that produces the best inverse match between the AFE response and the channel/transmitter response. The match may then be evaluated by measuring the magnitude of the residual ISI in the AFE output signal, for example, at the first 2 to 4 post-cursor bit positions. A peaking control setting that produces a good match between the AFE response and the channel may have a low ISI at the first 2 to 4 post-cursor bit positions. On the other hand, a peaking control setting that produces a poor match may have a high ISI at the first 2 to 4 post-cursor bit positions.

In some embodiments, the peaking control setting is varied and an attribute (e.g., a figure of merit (FOM)) is calculated. The attribute may be indicative of the quality of the equalization (e.g., low tap ISI measurements). A higher attribute may indicate better equalization by the AFE. The attribute may be determined based on two or more measurements. For example, the attribute may be based on a signal level and ISI measurements at one or more bit positions in the AFE response. The peaking control setting is selected when the attribute is improved and the receiver adaptation is performed using the selected peaking control setting. In some aspects, an initial AFE control setting may be set. Then, a determination may be made to whether another peaking control setting provides an improved attribute (i.e., better equalization).

In some embodiments, the peaking control setting is varied or updated until a termination condition is satisfied. The termination condition may be satisfied when a number of iterations is reached or until the attribute is no longer improving (i.e., attribute associated with a previous peaking control setting is higher than the attribute associated with the updated peaking control setting).

Solutions described herein advantageously solve the problem of failure to meet JTOL targets for reasons including, but not limited to, compensating for the process, temperature and parasitic variations by adjusting the AFE peaking control and providing a targeted response that meets and/or exceeds the jitter tolerance specification. Further, the AFE peaking control may be technology independent and minimizes test time by selecting the optimal setting needed to meet JTOL targets.

FIG. 1 shows a block diagram of an AFE 100, in accordance with an embodiment of the present disclosure. AFE 100 may include a termination block 102, an attenuator (ATT) 104, a buffer (BUF) 106, a continuous-time linear equalizer (CTLE/EQ) 108, a first voltage gain amplifier (VGA) 110, and a second VGA 112. AFE 100 may be used as part of a receiver. The receiver (Rx) may be implemented as an integrated circuit (IC) and may be part of a transceiver circuit in some implementations.

In some embodiments, termination block 102 may be tuned by the physical (PHY) layer using an off-chip reference resistor. Attenuator 104 attenuates incoming signal to acceptable levels for the subsequent CTLE/EQ 108 to maintain linearity in the case of a short-reach link. Buffer 106 provides variable gain. Buffer 106 may isolate input common mode level variations from the CTLE/EQ 108. Buffer 106 has programmable gain (labeled as rxX_buf_gain in FIG. 1) and bandwidth (BW) control (labeled as rxX_rate in FIG. 1).

CTLE 108 may equalize the incoming signal. CTLE 108 has a programmable boost level (labeled as rxX_eq_ctle_bst in FIG. 1), a boost pole frequency (labeled as rxX_eq_ctle_pole in FIG. 1), and boost bandwidth (BW) control (labeled as rxX_rate in FIG. 1). First VGA 110 and second VGA 112 are implemented to maintain a constant signal swing and to provide a more constant amplitude for a signal input into a decision feedback equalizer (DFE) 114. In some aspects, first VGA 110 has an analog gain control (labeled as rxX_eq_vga1_gain in FIG. 1) and a BW control (labeled as rxX_rate in FIG. 1). Second VGA 112 has an analog gain control (labeled as rxX_eq_vga2_gain in FIG. 1) and BW control (labeled as rxX_rate in FIG. 1). The two VGAs (i.e., first VGA 110 and second VGA 112) in series improve the gain control range. The second VGA 112 drives DFE 114.

In some embodiments, AFE 100 may include an AFE peaking control that is controlled by input 116. Input 116 may be used to adjust the peaking gain and bandwidth of the AFE frequency response around the system Nyquist frequency. In some aspects, input 116 may change the current that is flowing in each of BUF 106, CTLE 108, first VGA 110, and second VGA 112 and thereby changing the peaking gain (i.e., gain around the Nyquist frequency). Thus, the current may be increased or decreased in one or more circuits of AFE 100 by varying input 116.

Figure 2:
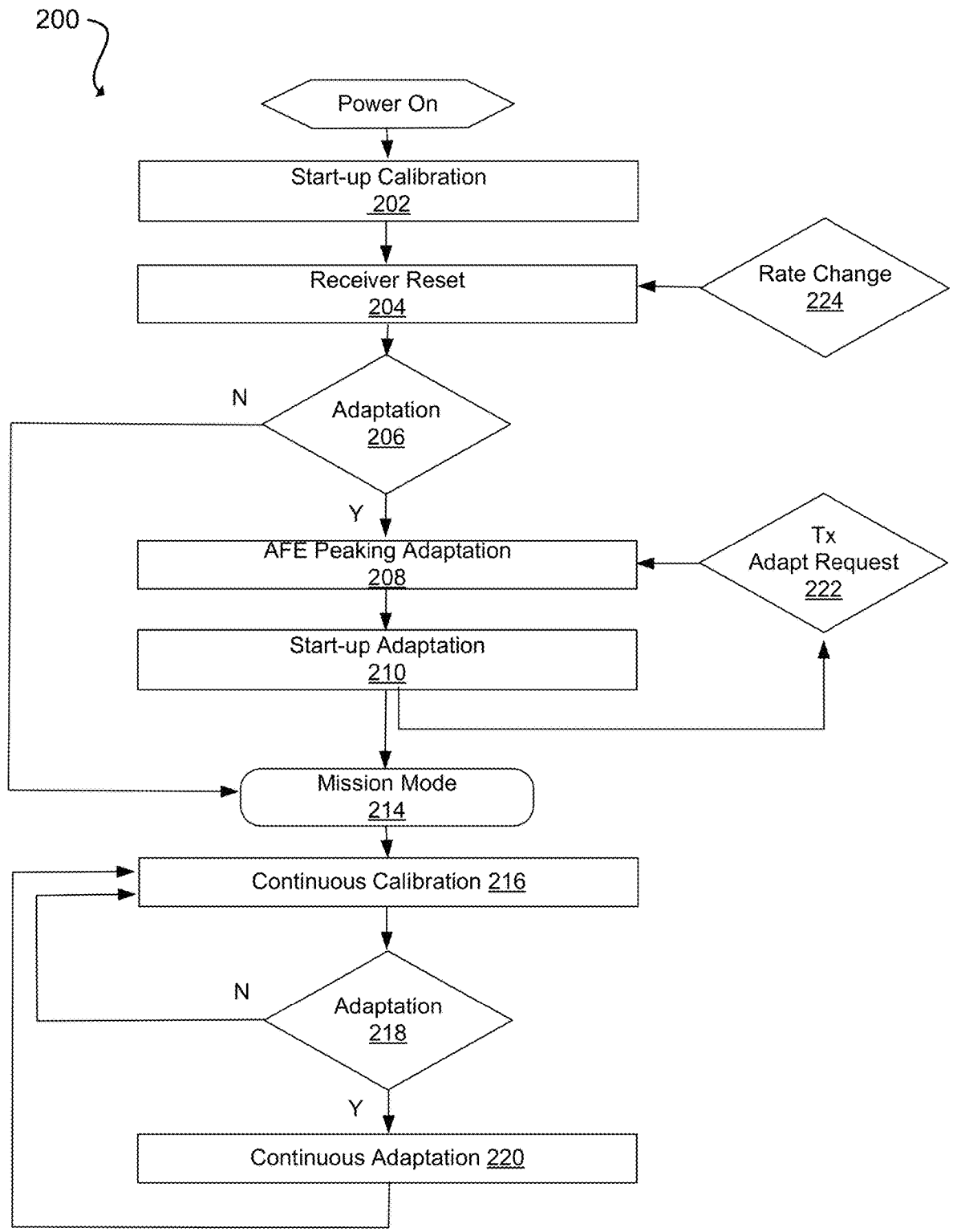
FIG. 2 illustrates a flowchart for performing calibration and adaptation of a receiver, in accordance with an embodiment of the present disclosure.

FIG. 2 is a flowchart of a method 200 for performing calibration and adaptation of a receiver, in accordance with an embodiment of the present disclosure.

In 202, the initial calibration is run. The calibration corrects for circuit offsets within the receiver. In some aspects, the offsets may be due to mismatch between different devices, components, and parasitics.

In 204, the receiver can be reset as part of a protocol rate change in 224. This determines the receiver speed (data rate).

In 206, a determination is made whether adaptation is to be performed. In some aspects, the determination may be based on a protocol that the receiver is running. In response to determining that adaptation is to be performed, the process proceeds to step 208. In response to determining that adaptation is not to be performed, the process proceeds to step 214. In some aspects, a protocol may not allow for adaptation of the receiver. For example, the adaptation steps may be skipped when the data rate is low such that the channel loss is low and adaptation/tuning of the receiver is not required to achieve the target bit error rate (BER).

In 208, an AFE peaking adaptation may be performed. In some embodiments, the AFE peaking adaptation may performed as shown and described in FIG. 3. For example, the peaking control setting may be varied and the peaking control setting that provides a more optimal equalization is selected. During the AFE peaking adaptation, the design is fine tuned (optimized) to maximize the peaking adaptation benefit while minimizing the algorithm iterations. The receiver is fine tuned for a given channel and transmitter (Tx) equalization. The fine tuning corrects for ISI introduced by the channel such that incoming data can be correctly detected. In some embodiments, AFE peaking adaptation and a start-up adaptation may be performed for one or more Tx configurations during link negotiation.

In 210, a start-up adaptation may be performed. In some aspects, adaptation may tune the receiver for transmit equalization by setting the AFE broadband gain and the equalization boost. Thus, gain adjustment, peaking adjustment, and equalization adjustment may be performed. Various controls (e.g., boost control, gain control) of one or more blocks of AFE 100 may be adjusted based on received data. For example, the gain of first VGA 110 and second VGA 112 (labeled as rxX_eq_vga1_gain and rxX_eq_vga2_gain in FIG. 1) may be set based on the received data. One or more algorithms may detect a channel profile and determine the various controls. For example, the gain and/or the boost may be swept to compensate for channel loss.

Steps 208 and 210 are repeated for different Tx equalization settings (or adapt requests) received in 222.

In 214, a mission mode (also referred to as an operation mode) may be entered. In mission mode, the receiver and the transmitter are communicating (e.g., the link is active). Data may be received in mission mode.

In 216, a continuous calibration may be performed. The receiver may be fine tuned for changes in environment conditions such as temperature. The receiver may detect a circuit offset and vary one or more control settings associated with the offset.

In 218, a determination is made to whether continuous adaptation is to be performed. In response to determining that continuous adaptation is to be performed the process proceeds to 220. In response to determining that adaptation is not to be performed, the process proceeds to 216. The determination may be based on the protocol used and/or the data rate. For example, the continuous adaptation may not be performed when the data rate is low.

In 220, continuous adaptation is performed and the process proceeds to step 216. Due to the time-varying nature of operating conditions (e.g., change in temperatures), the receiver equalization may be constantly or frequently performed to adapt to the changing channel characteristics. In some embodiments, the receiver may measure ISI and/or signal amplitude during the adaptation. One or more controls are adjusted based on the measurement. In some aspects, continuous adaption may provide limited control to the receiver settings as compared to start-up adaptation (performed in 210) (e.g., step size limit). In some aspects, the continuous calibration and the continuous adaptation may be performed every 1 second. For example, the receiver may check whether any changes in environmental conditions every 1 second. In response to determining that there is a change in the environmental conditions, the gain and boost of one or more blocks of AFE 100 may be varied. In addition, the taps of DFE 114 may be varied. In some aspects, a smaller step size for changing the control setting (e.g., boost, gain) compared to the start-up adaptation is used. The smaller step size may provide the advantage not to disturb the link while in mission mode. In some aspects, the continuous adaptation and continuous calibration may be based on statistic (data) collected while in the mission mode. The BER may be maintained by performing continuous calibration and continuous adaptation.

Figure 3:
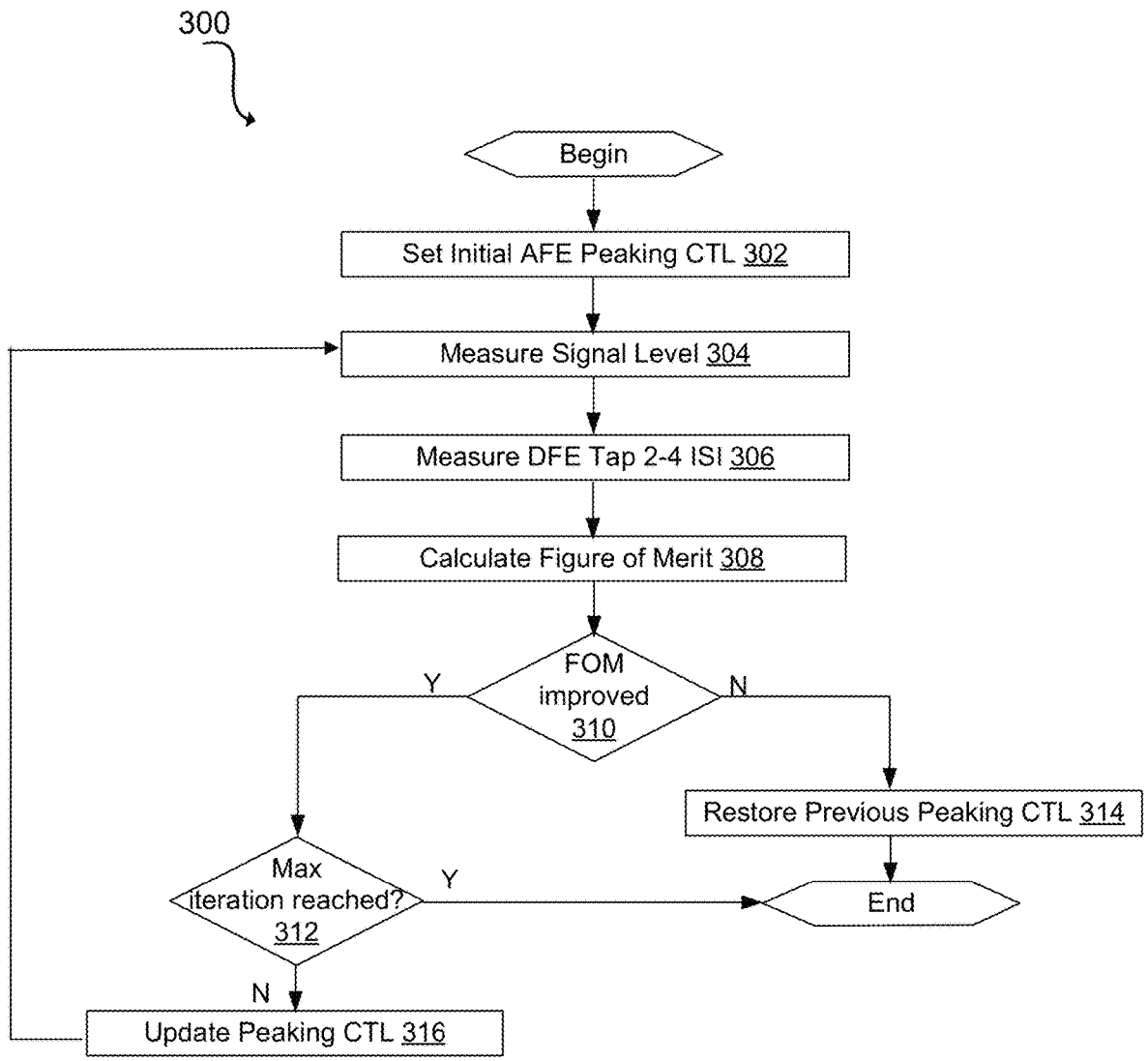
FIG. 3 illustrates a flowchart for performing AFE peaking adaptation, in accordance with an embodiment of the present disclosure.

FIG. 3 is a flowchart of a method 300 for peaking adaptation, in accordance with an embodiment of the present disclosure.

In 302, an initial peaking control setting may be set. In some aspects, the initial peaking control setting may be based on system simulations. In some embodiments, the peaking control setting may be based on parasitics within the AFE and protocol equalization targets.

In some embodiments, the peaking control setting may be a 3-bit control word. Each word may be mapped to a current setting of the one or more blocks of the AFE 100. In some aspects, the initial peaking control setting may be set to four.

In 304, the signal level is measured. For example, a magnitude of the signal level is measured at the AFE output.

In 306, the ISI at the AFE output is measured. In some aspects, the magnitude of residual ISI at one or more bit positions in an AFE output response is measured. For example, the DFE tap 2-4 ISI is measured.

In 308, an attribute (e.g., FOM) for the peaking control setting is determined. The attribute may be used to characterize the AFE equalization of the signal for a current peaking control setting. The attribute may be indicative of the quality of the equalization (e.g., low residual ISI measurements). In some embodiments, the attribute may be a normalized based on the level of a signal magnitude. In some aspects, the attribute may be a function of the signal level and the tap 2-4 ISI measurements. For example, the attribute may be equal to the ratio of the measured ISI to the signal level.

In 310, a determination is made whether the attribute has improved (e.g., a higher FOM is obtained). For example, the current attribute may be compared with a previous attribute. In response to determining that the attribute has improved the process may proceed to 312. In response to determining that the attribute has not improved (e.g., current FOM is less than the previous attribute), the process may proceed to 314. The attribute may not improve when the change in the peaking control setting causes the AFE to go from under-equalized to over-equalized or from over-equalized to under-equalized.

In 312, a determination is made to whether a termination condition is satisfied. The termination condition may be satisfied when a maximum number of iterations is reached. In some aspects, an iteration counter may be updated. The iteration counter may be compared with a stored maximum number of iterations. In response to determining that the termination condition is satisfied the process may end. In response to determining that the termination condition is not satisfied the process may proceed to 316.

In some aspects, the maximum number of iterations may be based on an adaptation time allowed for a given protocol. For example, the maximum number of iterations is selected such as the adaptation time is not exceeded. In some aspects, the maximum number of iterations may be based on mid-value of the peaking control setting. For example, the maximum number of iterations is selected such as both edges of a peaking control range may be reached when the initial peaking control is selected to be equal to the mid-value. The mid-value may correspond to the initial peaking control setting and determined based on the system simulations. In some aspects, the maximum number of iterations is determined such as the entire range of the peaking control may be span.

In 316, the peaking control setting is updated. As described previously herein, the peaking control setting may be based on a control word of a predetermined number of bits. Each peaking control setting may correspond to an analog setting. For example, a change in the peaking control setting may correspond to a change in the current of the analog circuit. In some aspects, the peaking control may be a 3-bits peaking control that results in eight combinations. In some aspects, the peaking control may be updated based on the previous peaking control change (i.e., moving in the same direction). If the previous update was a step up, another step up is performed. For example, if the previous peaking control setting was equal to four, then the peaking control setting is updated to five. If the previous update was a step-down, then a step-down is performed. For example, if the previous peaking control setting was equal to four, then the peaking control setting is set to three. Then, the process proceeds to step 304.

In some aspects, in response to determining that the attribute did not improve and the maximum number of iterations has not been reached, the peaking control setting may be updated in a reverse direction. For example, if the previous change in the peaking control setting was a step up, then a step down is performed and the corresponding attribute is determined.

In 314, the previous peaking control is restored and the process ends. For example, if the initial peaking control is equal to four and an updated peaking control of five resulted in a lower attribute, then the peaking control setting is set to four. Then, the process may proceed with the start-up adaptation as shown in 210 of FIG. 2.

Figure 4A:
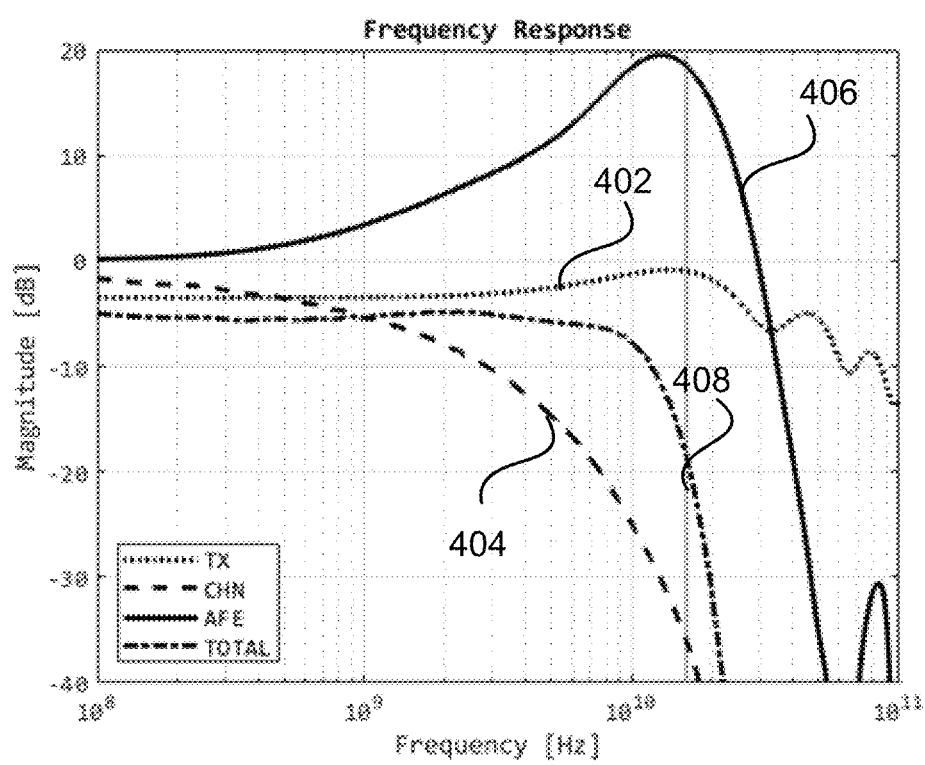
FIGS. 4A, 4B, and 4C show system simulation results for the process and extraction corner that produces the lowest AFE broadband gain, in accordance with an embodiment of the present disclosure.
Figure 4B:
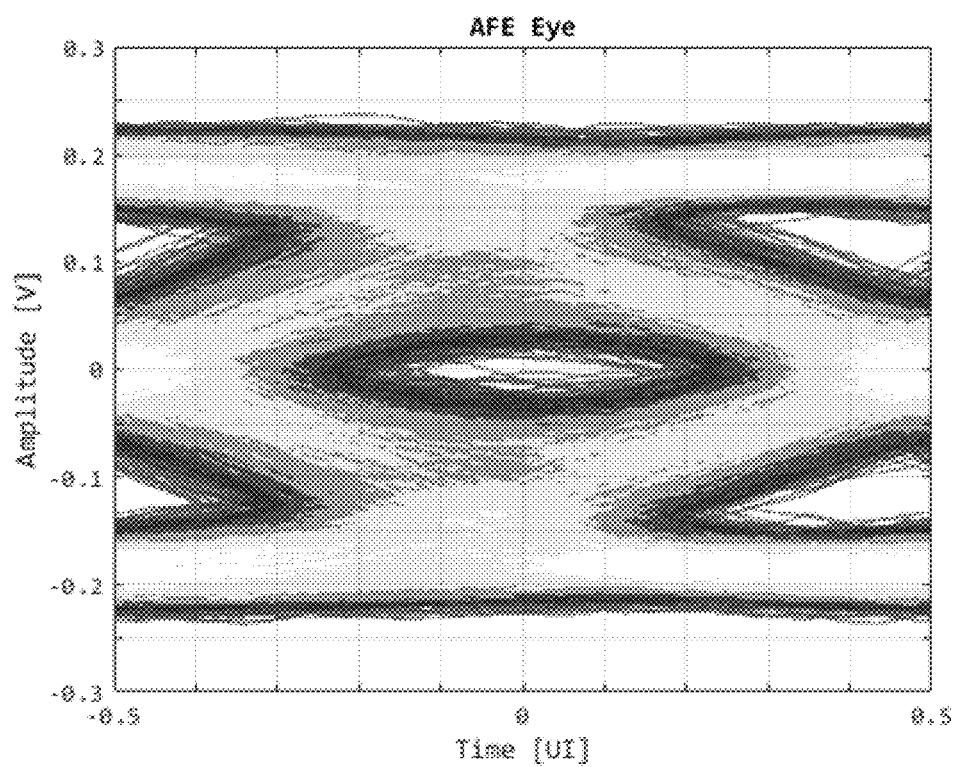
Figure 4C:
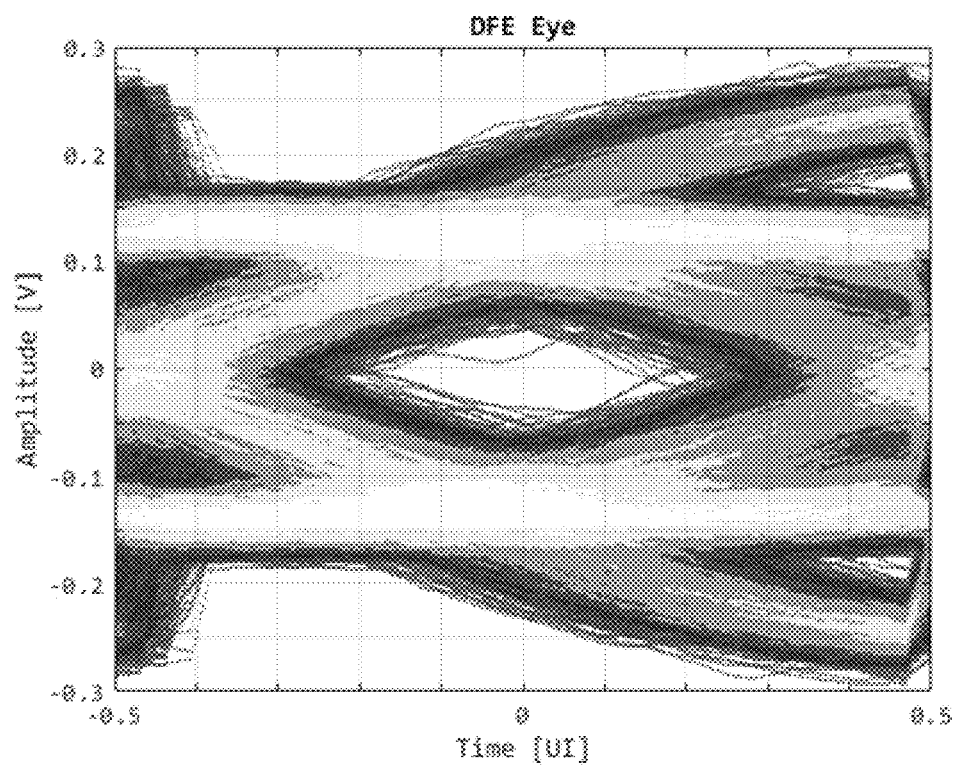

FIGS. 4A, 4B, and 4C show system simulation results for the process and extraction corner that produces the lowest AFE broadband gain, in accordance with an embodiment of the present disclosure. The simulations parameters are as follows: the line loss is equal to −36.6 dB and the baud rate is equal to 32 G.

FIG. 4A shows the frequency response, in accordance with an embodiment of the present disclosure. Trace 402 shows the frequency response of the transmitter. Trace 404 shows the frequency response of the channel. Trace 406 shows the frequency response associated with the AFE. Trace 408 shows the total frequency response (i.e., channel, AFE, and transmitter). A flatter response for the total frequency for a higher frequency is desired. FIG. 4B shows the eye diagram for the AFE. The eye diagram shows the output of the AFE only. FIG. 4C shows the eye diagram for the DFE. The eye diagram in FIG. 4C shows the effective response for both the DFE and the AFE (i.e., includes the DFE tap correction). Here, a peaking control value of 4 may produce a good match between the channel frequency response and the AFE response. In addition, a good vertical and horizontal eye margins are obtained as shown in FIG. 4C.

Figure 5A:
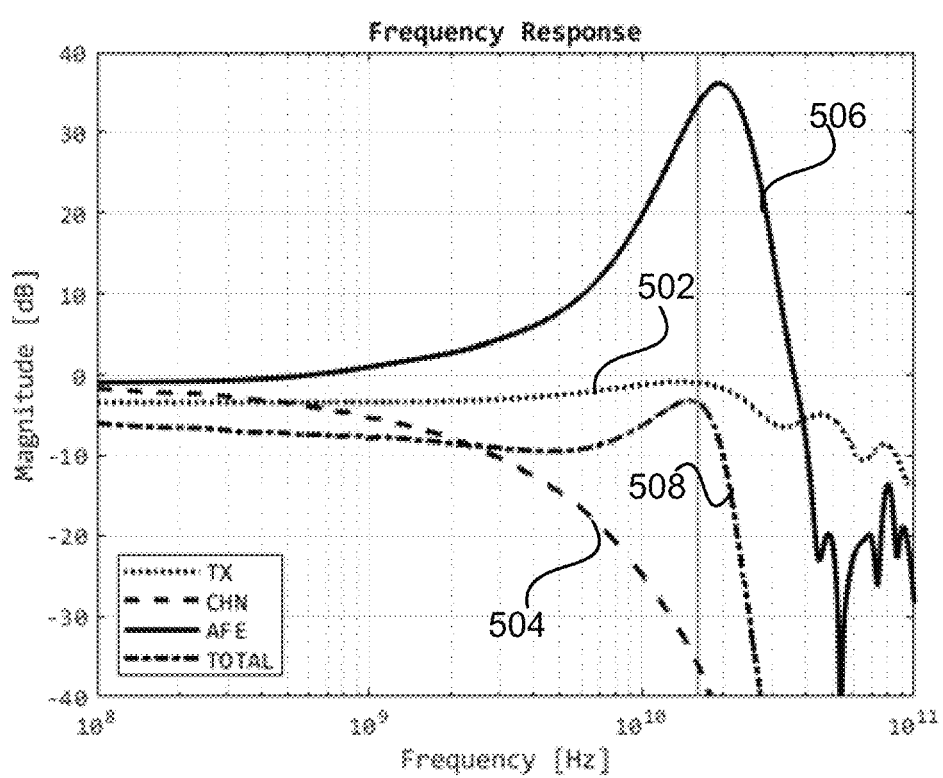
FIGS. 5A, 5B, and 5C show system simulation results for the process and extraction corner that produces the highest AFE broadband gain where the AFE is configured with a high peaking setting (the same setting that is used for the low gain corner), in accordance with an embodiment of the present disclosure.
Figure 5B:
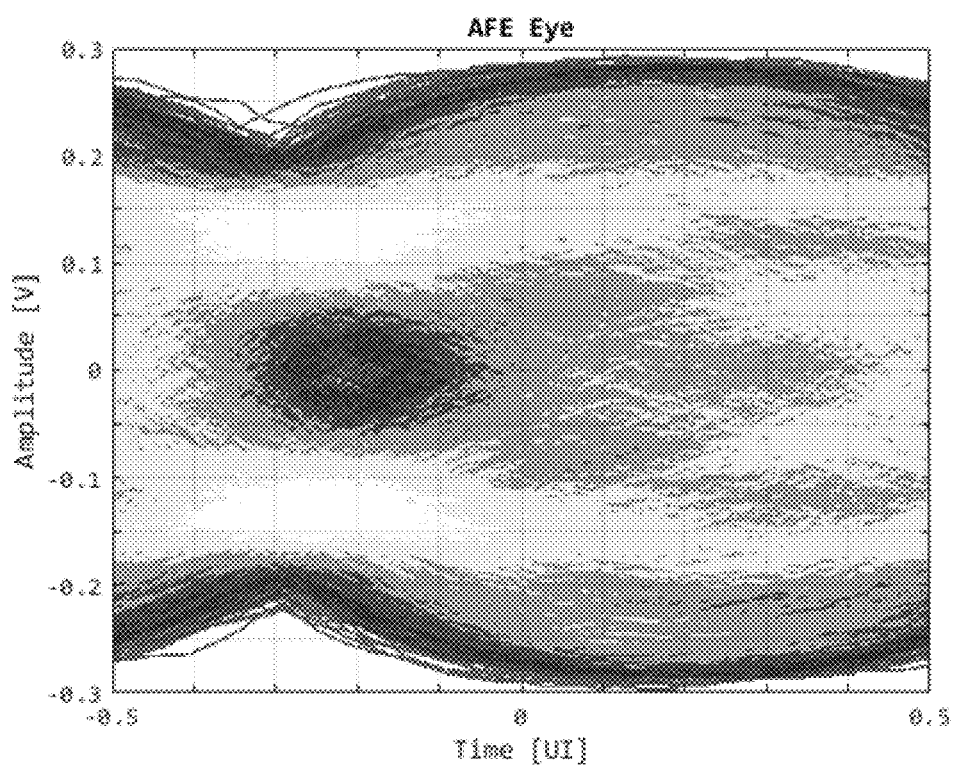
Figure 5C:
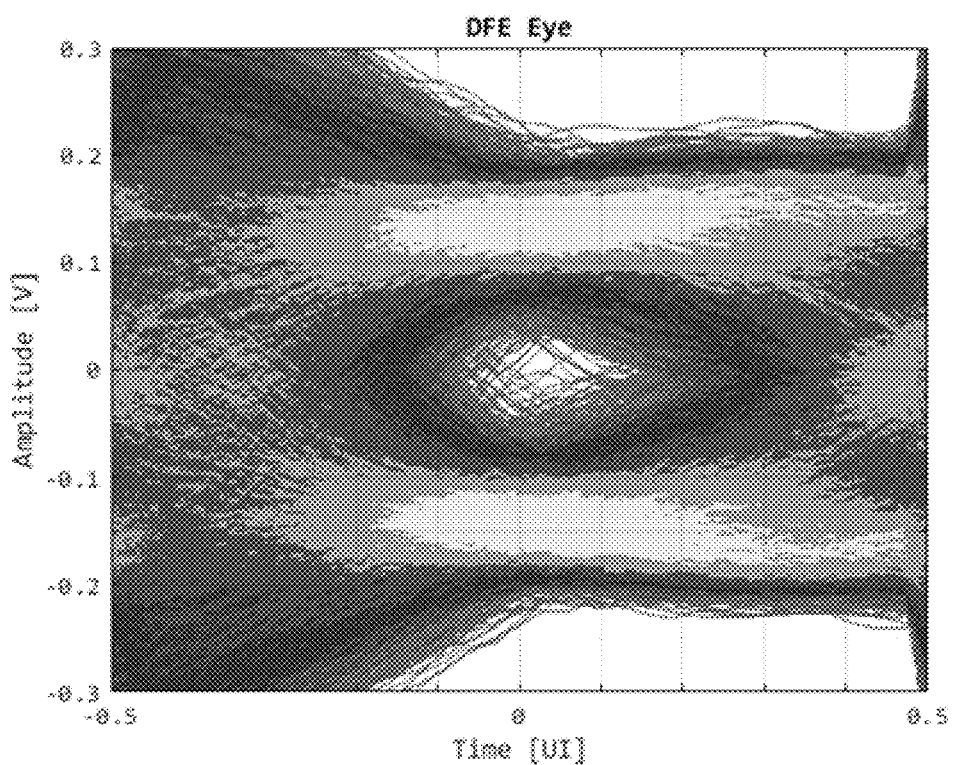

FIGS. 5A-5C show system simulation results for the process and extraction corner that produces the highest AFE broadband gain where the AFE is configured with a high peaking setting, in accordance with an embodiment of the present disclosure. The simulations parameters are as follows: the line loss is equal to −36.6 dB and the baud rate is equal to 32 G. The peaking control setting is set to four (the same setting that is used for the low gain corner).

FIG. 5A shows the frequency response, in accordance with an embodiment of the present disclosure. Trace 502 shows the frequency response of the transmitter. Trace 504 shows the frequency response of the channel. Trace 506 shows the frequency response associated with the AFE. Trace 508 shows the total frequency response (i.e., channel, AFE, and transmitter). FIG. 5B shows the eye diagram for the AFE. The eye diagram shows the output of the AFE only. FIG. 5C shows the eye diagram for the DFE. The eye diagram shows the effective response for both the DFE and the AFE (i.e., includes the DFE tap correction). Here, a peaking control setting of 4 may produce a poor match between the AFE response and the channel response. In this case, the AFE peaking is excessive, and the total frequency response that is a combination of the transmitter, channel, and AFE responses has excess peaking around Nyquist as shown by trace 508 of FIG. 5A compared to trace 408 of FIG. 4A.

For the peaking control value of 4, the adapted DFE tap 1 value is −39.8 mV, DFE tap 2 value is 38.7 mV, DFE tap 3 is −14.4 mV, DFE tap 4 is 14.8 mV, DFE tap 5 is −3.9 mV, DFE tap 6 is 3.3 mV, DFE tap 7 is 0.3 mV, DFE tap 8 is 1.6 mV, and so the sum of the magnitudes of DFE taps 2 to 4 is 67.9 mV.

Figure 6A:
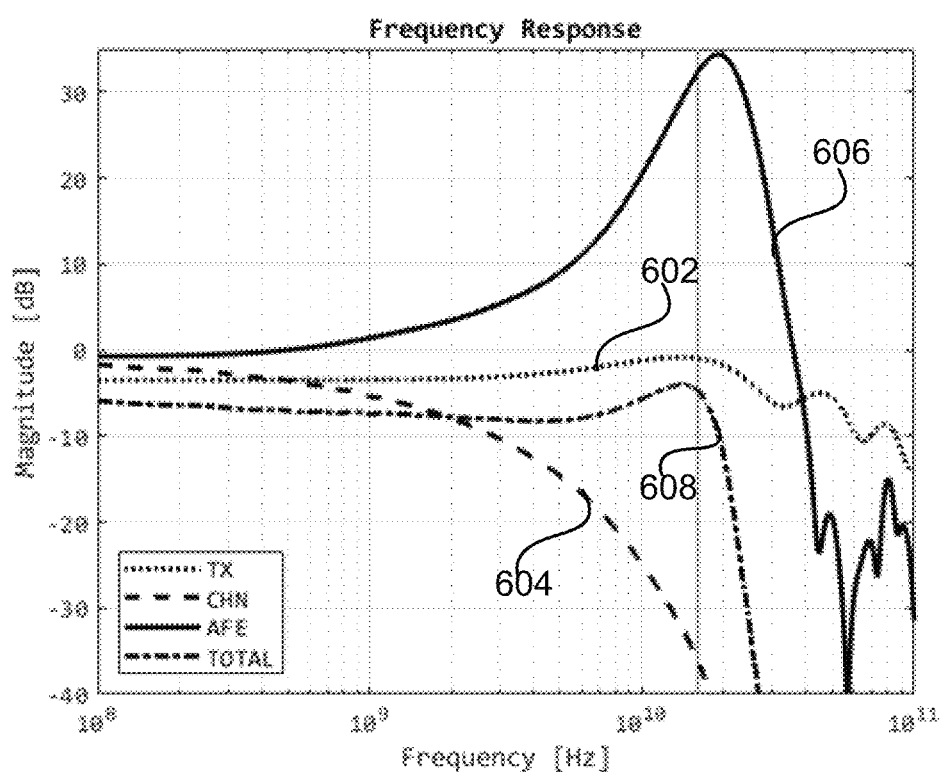
FIGS. 6A, 6B, and 6C show system simulation results for the process and extraction corner that produces the highest AFE broadband gain where the AFE is configured with a medium peaking setting, in accordance with an embodiment of the present disclosure.
Figure 6B:
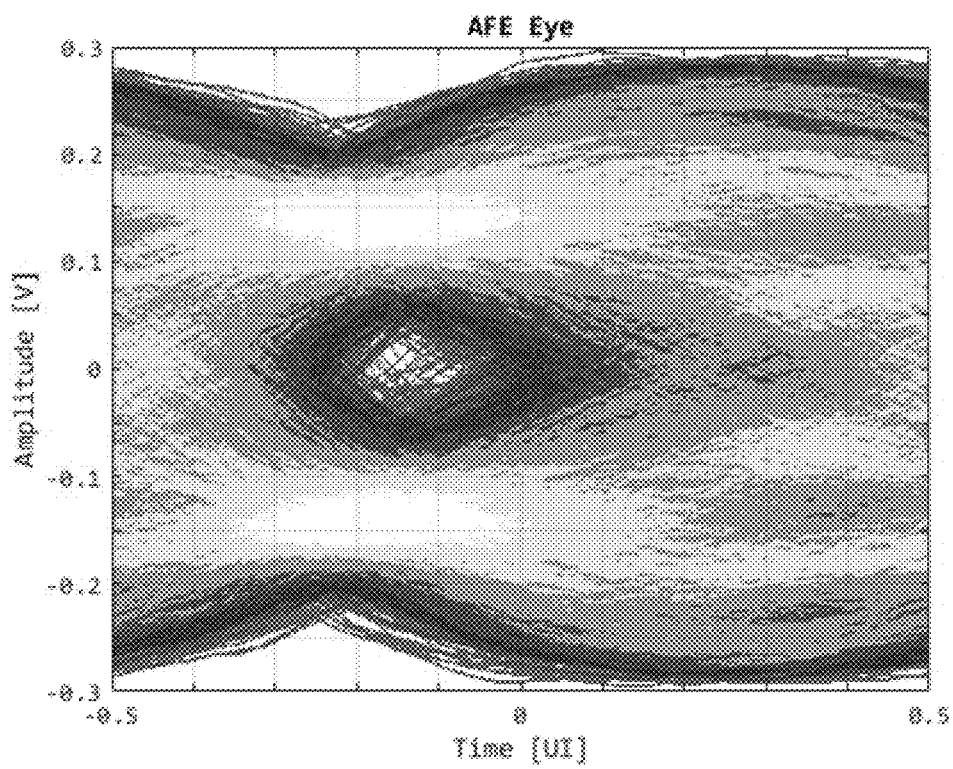
Figure 6C:
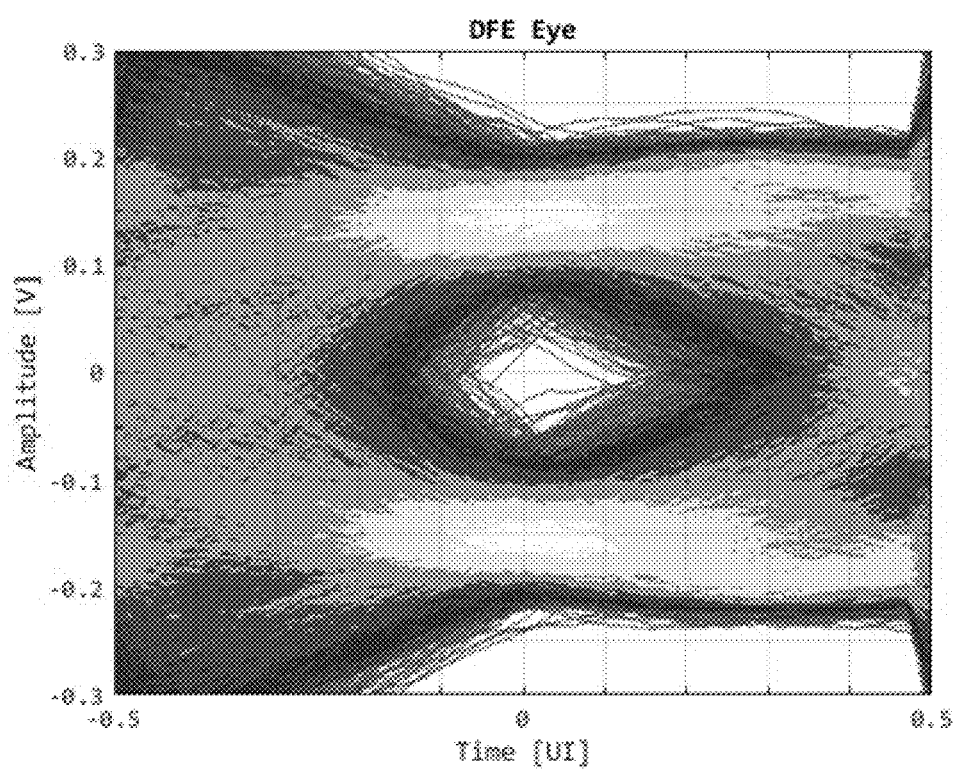

FIGS. 6A-6C show system simulation results for the process and extraction corner that produces the highest AFE broadband gain where the AFE is configured with a medium peaking setting, in accordance with an embodiment of the present disclosure. The simulations parameters are as follows: the line loss is equal to −36.6 dB and the baud rate is equal to 32 G. The peaking control setting is set to three.

FIG. 6A shows the frequency response, in accordance with an embodiment of the present disclosure. Trace 602 shows the frequency response of the transmitter. Trace 604 shows the frequency response of the channel. Trace 606 shows the frequency response associated with the AFE. Trace 608 shows the total frequency response (i.e., channel, AFE, and transmitter). FIG. 6B shows the eye diagram for the AFE. FIG. 6C shows the eye diagram for the DFE. The eye diagram shows the effective response for both the DFE and the AFE (i.e., includes the DFE tap correction).

The adapted DFE tap 1 value is −41.5 mV, DFE tap 2 value is 28.2 mV, DFE tap 3 is −9.8 mV, DFE tap 4 is 9.2 mV, DFE tap 5 is −2 mV, DFE tap 6 is 2 mV, DFE tap 7 is 0.3 mV, DFE tap 8 is 1.0 mV, and so the sum of the magnitudes of DFE taps 2 to 4 is 47.2 mV.

Figure 7A:
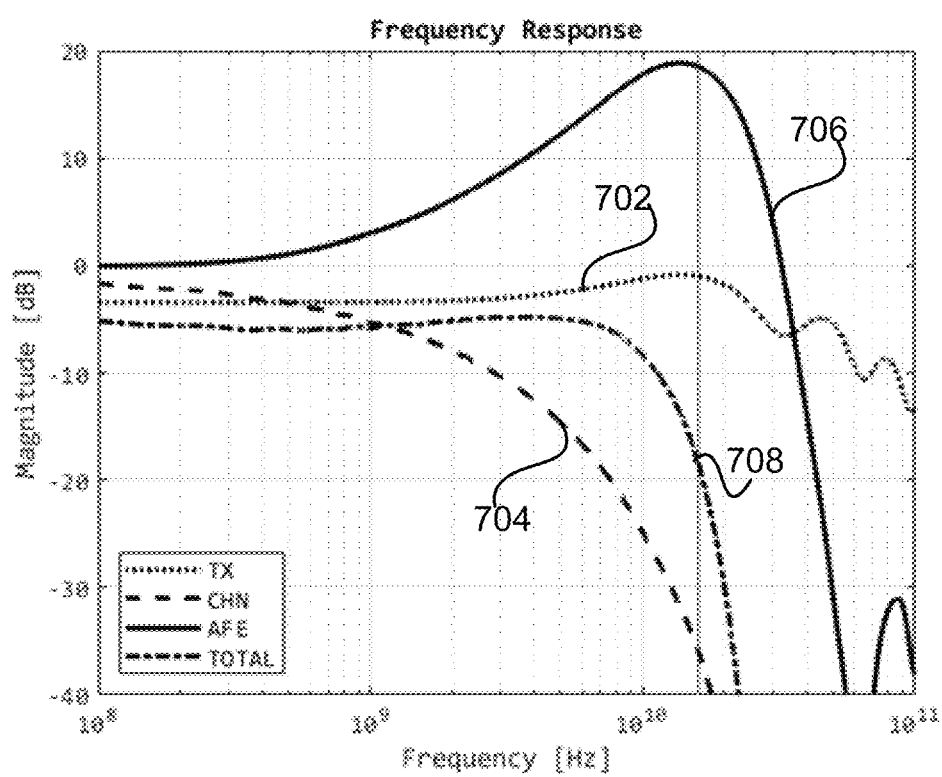
FIGS. 7A, 7B, and 7C show system simulation results for the process and extraction corner that produces the highest AFE broadband gain where the AFE is configured with a low peaking setting, in accordance with an embodiment of the present disclosure.
Figure 7B:
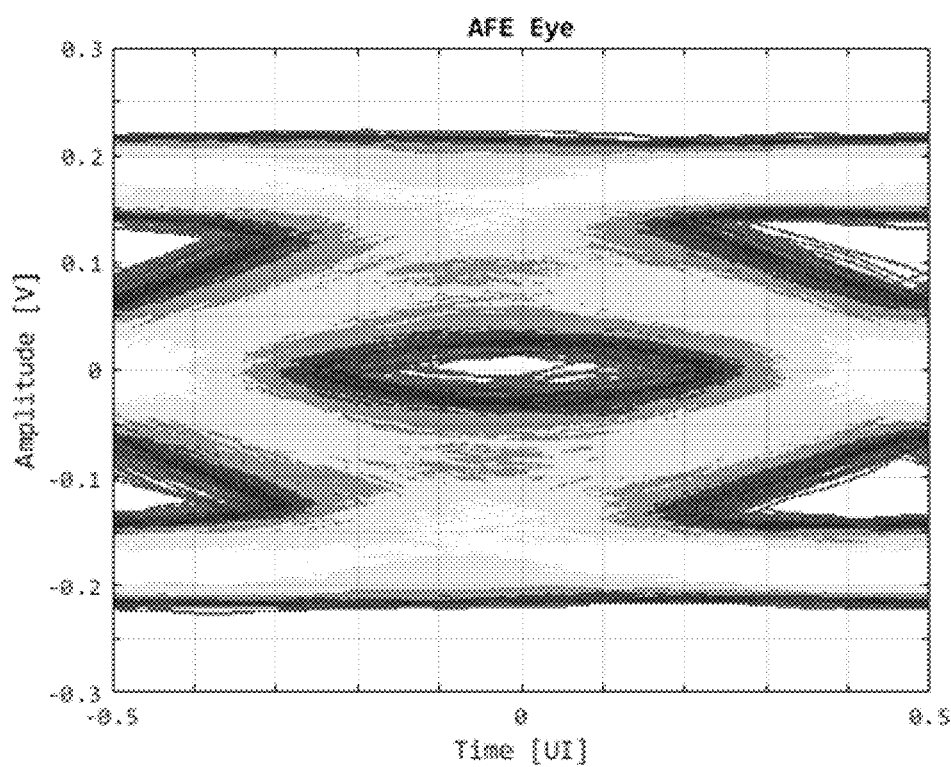
Figure 7C:
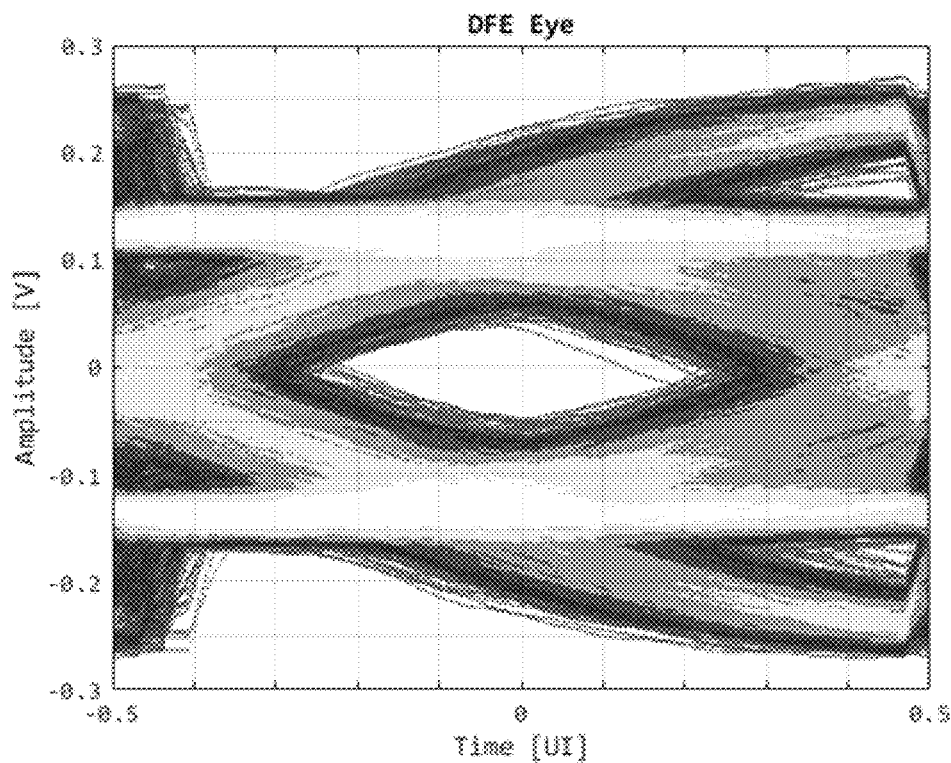

FIGS. 7A-7C show system simulation results for the process and extraction corner that produces the highest AFE broadband gain where the AFE is configured with a low peaking setting, in accordance with an embodiment of the present disclosure. The simulations parameters are as follows: the line loss is equal to −36.6 dB and the baud rate is equal to 32 G. The peaking control setting is set to two. FIG. 7A shows the frequency response, in accordance with an embodiment of the present disclosure. Trace 702 shows the frequency response of the transmitter. Trace 704 shows the frequency response of the channel. Trace 706 shows the frequency response associated with the AFE. Trace 708 shows the total frequency response (i.e., channel, AFE, and transmitter). FIG. 7B shows the eye diagram for the AFE. FIG. 7C shows the eye diagram for the DFE. The eye diagram shows the effective response for both the DFE and the AFE (i.e., includes the DFE tap correction).

For the peaking control value of 2, the adapted DFE tap 1 value is 48.1 mV, DFE tap 2 value is −9.5 mV, DFE tap 3 is −5.9 mV, DFE tap 4 is −1.3 mV, DFE tap 5 is −1.0 mV, DFE tap 6 is −0.7 mV, DFE tap 7 is 0.7 mV, DFE tap 8 is 0.7 mV, and so the sum of the magnitudes of DFE taps 2 to 4 is 16.7 mV.

The best match between the AFE response and the channel response may be produced with the highest vertical and horizontal eye margins for a peaking control of two. Therefore, the peaking control setting can be selected by minimizing the sum of the magnitudes of DFE taps 2 to 4, i.e., the ISI at post-cursor bit positions 2 to 4 during receiver adaptation.

In one embodiment, the AFE peaking control may be adjusted during the receiver adaption for a temperature range of about −40 degrees Celsius to about 125 degrees Celsius, up to 38 dB channel loss, and for up to 32 Gbps without any adverse impact to exit latency times.

Figure 8:
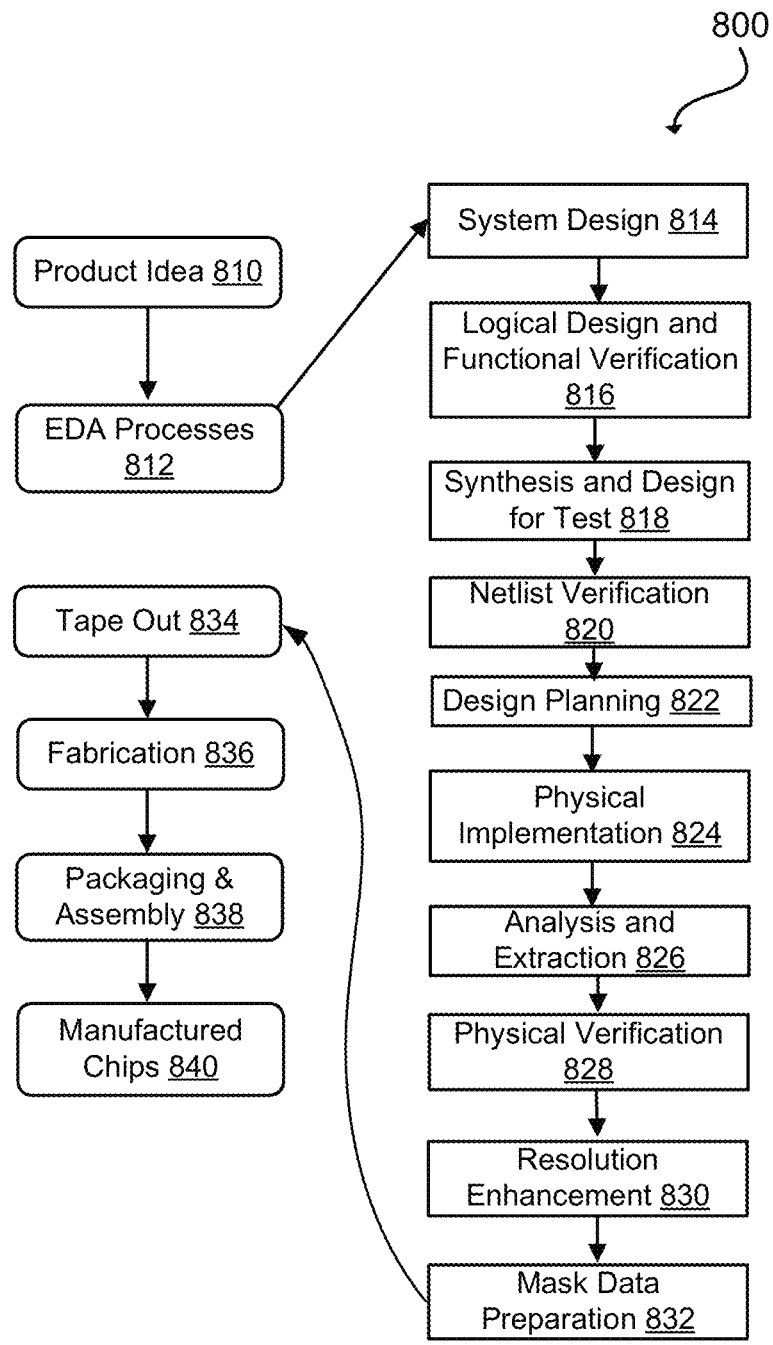
FIG. 8 illustrates a flowchart of various processes used during the design and fabrication of an integrated circuit, according to an exemplary embodiment of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information that is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836, and packaging and assembly processes 838 are performed to produce the finished integrated circuit 840.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 8. The processes described by being enabled by EDA products (or tools).

During system design 814, the functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During the logic design and functional verification 816, modules or components in the circuit are specified in one or more description languages, and the specification is checked for functional accuracy. For example, the components of the circuit may be verified to generate outputs that match the requirements of the specification of the circuit or system being designed. Functional verification may use simulators and other programs such as test bench generators, static HDL checkers, and formal verifiers. In some embodiments, special systems of components referred to as 'emulators' or 'prototyping systems' are used to speed up the functional verification.

During synthesis and design for test 818, HDL code is transformed into a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for the production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for the development of cells for the library and for the physical and logical design that use the library.

Figure 9:
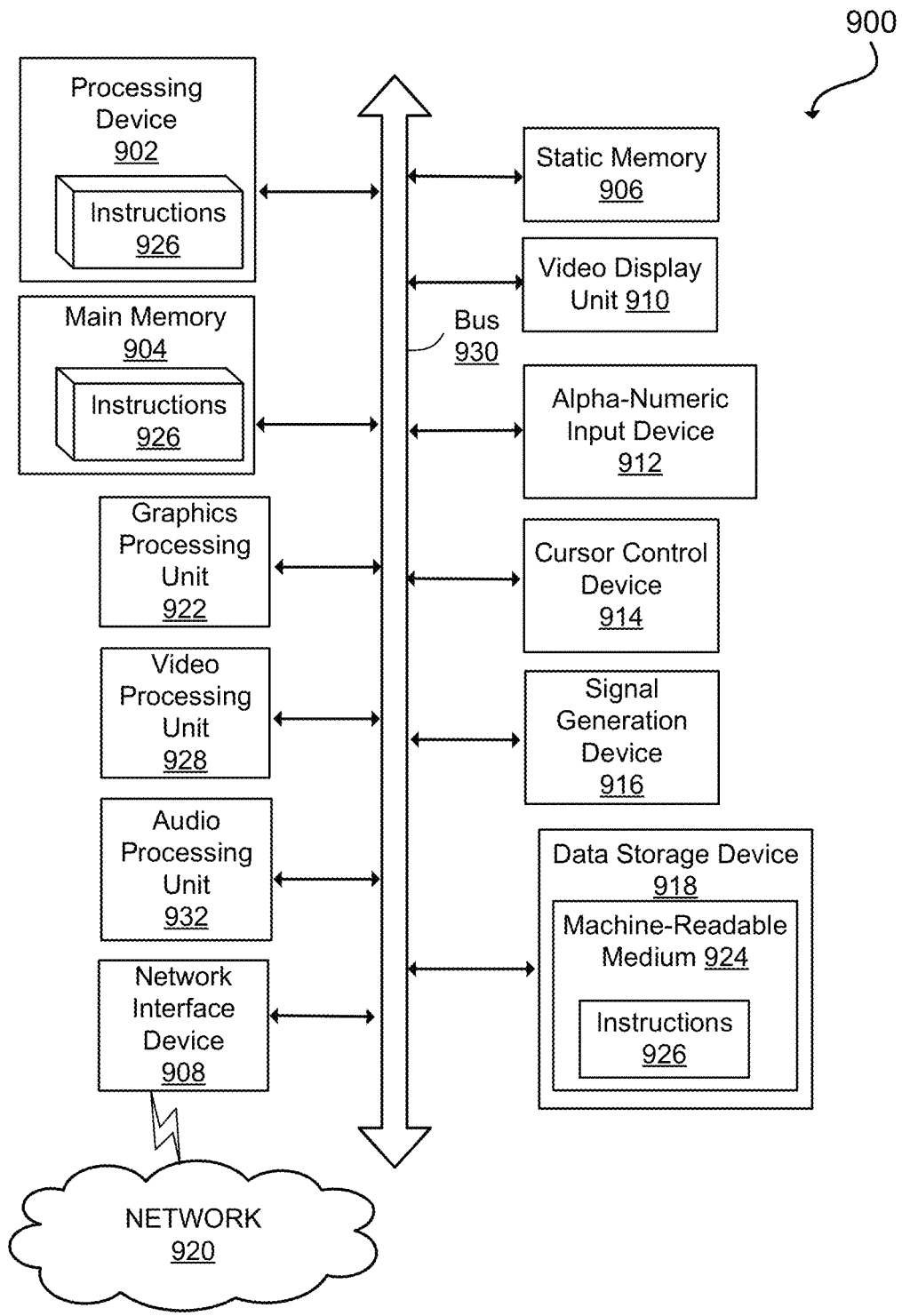
FIG. 9 illustrates a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

The processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 802 may also be one or more special-purpose processing devices such as an application-specific integrated circuit (ASIC), a field-programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904, and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work to others skilled in the art most effectively. An algorithm may be a sequence of operations leading to the desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure, as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures, and like elements are labeled with like numerals. The disclosure and drawings are, accordingly, to be regarded in an illustrative sense rather than a restrictive sense.

What is claimed is:

1. A method comprising:
   determining a peaking control value for an analog front end (AFE) of a receiver, the peaking control value controlling a frequency response of the AFE;
   determining an attribute corresponding to the peaking control value;
   selecting, using a processor, the peaking control value as an operating peaking control value for the AFE based on the attribute being determined to be higher than a previous attribute; and
   performing a receiver adaptation using the peaking control value for one or more transmitter configurations.

2. The method of claim 1, further comprising:
   iteratively performing a peaking control value update until a termination condition is satisfied.

3. The method of claim 2, wherein the termination condition is satisfied when the attribute associated with an updated peaking control value is less than the previous attribute.

4. The method of claim 2, further comprising:
   updating an iteration counter; and
   comparing the iteration counter to a number of iterations, wherein the termination condition is satisfied when the iteration counter is greater than the number of iterations, and wherein the number of iterations is based on a peaking control range.

5. The method of claim 1, wherein determining the peaking control value further comprises:
   determining whether to step up or step down from a second peaking control value associated with the previous attribute and a first peaking control value, wherein the first peaking control value is set as the operating peaking control value before the second peaking control value.

6. The method of claim 1, further comprising:
   selecting an initial peaking control value based on parasitics within the AFE and protocol equalization targets.

7. The method of claim 1, wherein the peaking control value corresponds to a peaking current in one or more circuits of the AFE.

8. The method of claim 1, wherein determining the attribute comprises:
   measuring a magnitude of residual inter-symbol interference at a bit position in an AFE output response; and
   measuring a magnitude of a signal level; and
   wherein the attribute is based on the magnitude of residual inter-symbol interference and the magnitude of the signal level.

9. A system comprising:
   a memory storing instructions; and
   a processor, coupled with the memory and to execute the instructions, the instructions when executed cause the processor to:
      determine a peaking control value for an analog front end (AFE) of a receiver, the peaking control value controlling a frequency response of the AFE;
      determine an attribute corresponding to the peaking control value;
      select the peaking control value as an operating peaking control value for the AFE based on the attribute being determined to be higher than a previous attribute; and
      perform a receiver adaptation using the peaking control value for one or more transmitter configurations.

10. The system of claim 9, wherein the processor is further configured to:
    iteratively perform an peaking control value update until a termination condition is satisfied.

11. The system of claim 10, wherein the termination condition is satisfied when the attribute associated with an updated peaking control value is less than the previous attribute.

12. The system of claim 10, wherein the processor is further configured to:
    update an iteration counter; and
    compare the iteration counter to a number of iterations, wherein the termination condition is satisfied when the iteration counter is greater than the number of iterations, and wherein the number of iterations is based on a peaking control range.

13. The system of claim 9, wherein the processor is further configured to:
    determine whether to step up or step down from a second peaking control value associated with the previous attribute and a first peaking control value, wherein the first peaking control value is set as the operating peaking control value before the second peaking control value.

14. The system of claim 9, wherein the processor is further configured to:
    select an initial peaking control value based on parasitics within the AFE and protocol equalization targets.

15. The system of claim 9, wherein the peaking control value corresponds to a peaking current in one or more circuits of the AFE.

16. The system of claim 9, wherein the processor is further configured to:
    measure a magnitude of residual inter-symbol interference at a bit position in an AFE output response; and
    measure a magnitude of a signal level; and
    wherein the attribute is based on the magnitude of residual inter-symbol interference and the magnitude of the signal level.

17. A non-transitory computer readable medium comprising stored instructions, which when executed by a processor, cause the processor to:
    determine a first peaking control value and a second peaking control value for an analog front end (AFE) of a receiver, the first peaking control value and the second peaking control value controlling a frequency response of the AFE;
    determine a first attribute and a second attribute corresponding to the first and the second peaking control values, respectively;
    select the first peaking control value based on the first attribute being determined to be higher than the second attribute; and
    perform a receiver adaptation using the first peaking control value.

18. The non-transitory computer readable medium of claim 17, wherein the processor is further configured to:
   iteratively perform a peaking control value update until a termination condition is satisfied.

19. The non-transitory computer readable medium of claim 18, wherein the termination condition is satisfied when an attribute associated with an updated peaking control value is less than a previous attribute.

20. The non-transitory computer readable medium of claim 18, wherein the peaking control value corresponds to a peaking current in one or more circuits of the AFE.

* * * * *